US008488517B2

(12) United States Patent
Nadler et al.

(10) Patent No.: US 8,488,517 B2
(45) Date of Patent: Jul. 16, 2013

(54) DIGITAL REPEATER MODULE AND METHOD FOR RELAYING DIGITAL DATA

(75) Inventors: Gary J. Nadler, Marlboro, NJ (US); Peter Doherty, Rockville, MD (US); Steve Schwartz, Bellmore, NY (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 13/606,715

(22) Filed: Sep. 7, 2012

(65) Prior Publication Data

US 2012/0327979 A1 Dec. 27, 2012

Related U.S. Application Data

(62) Division of application No. 12/157,420, filed on Jun. 9, 2008, now Pat. No. 8,290,026.

(51) Int. Cl.
*H04B 7/185* (2006.01)
*H04B 3/36* (2006.01)

(52) U.S. Cl.
USPC .......................................... 370/316; 375/211

(58) Field of Classification Search
USPC .................. 375/211, 214, 259; 370/310, 315, 370/316; 455/7, 11.1, 12.1; 379/338
See application file for complete search history.

(56) References Cited

U.S. PATENT DOCUMENTS 7,710,907 B2 * 5/2010 Mahany ..................... 370/310.2
7,848,702 B2 * 12/2010 Ho et al. ...................... 455/11.1
7,904,921 B2 * 3/2011 Yun et al. ........................ 725/33
2004/0038647 A1 * 2/2004 Mahany ........................... 455/73
2007/0086421 A1 * 4/2007 Hong et al. ................... 370/349
2008/0129591 A1 * 6/2008 Lamance et al. ........ 342/357.12
2009/0138745 A1 * 5/2009 Dorsey et al. ................. 713/501

OTHER PUBLICATIONS

ITU Recommendations, "Frequency Sharing Between Systems in the Fixed-Satellite Service and Radio-Relay Systems in the same frequency band," Rec. ITU-R SF 355-4, 1963-1992.*

* cited by examiner

*Primary Examiner* — Tesfaldet Bocure

(74) *Attorney, Agent, or Firm* — Farjami & Farjami LLP

(57) ABSTRACT

There is provided a digital repeater module and method for relaying digital data. The digital repeater module comprises a data reception unit configured to receive digital data from several broadcast devices concurrently, a data transmission unit configured to transmit digital data using a multiple transmission protocols concurrently, and a routing application. The routing application can receive digital data through the data reception unit, identify available data paths for relaying the digital data to desired destinations, and determine transmission metrics for each of the available data paths for relaying the digital data to the desired destinations. The routing application can also select data paths for transmission based on the determined transmission metrics, and transmit the digital data using the selected data paths through the data transmission unit. There is also provided a method for resolving assignment of limited broadcast frequencies using the digital repeater module.

8 Claims, 5 Drawing Sheets

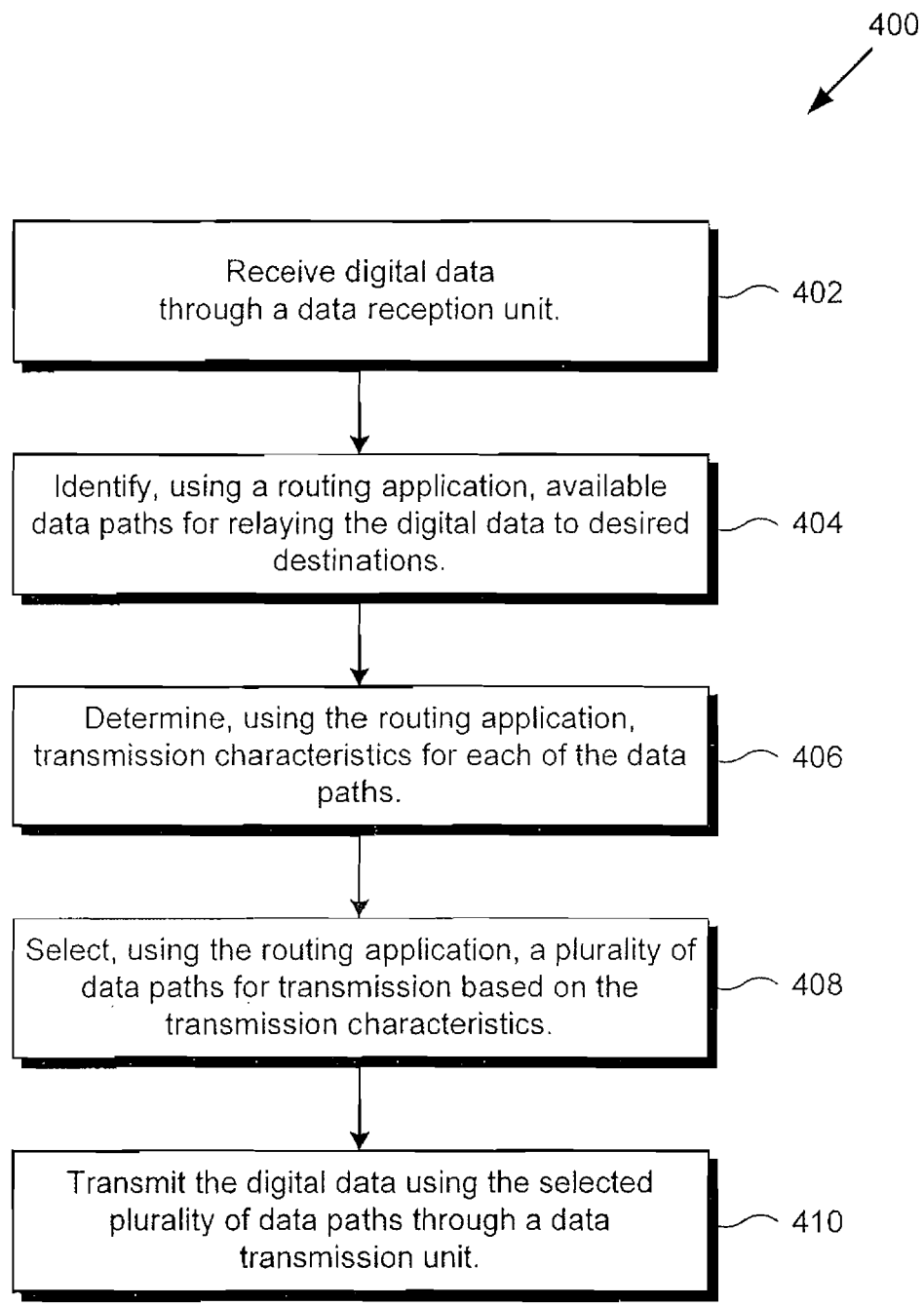

DIGITAL REPEATER MODULE AND METHOD FOR RELAYING DIGITAL DATA

This application is a Division of U.S. patent application Ser. No. 12/157,420, filed on Jun. 9, 2008, now issued as U.S. Pat. No. 8,290,026 issued on Oct. 16, 2012.

BACKGROUND OF THE INVENTION

1. Field of the Invention

The present invention relates generally to electronic circuits and systems. More particularly, the present invention relates to communications systems for transmission of digital data.

2. Background Art

Television news provides the public with coverage of interesting and relevant local news and events, assists law enforcement in finding and identifying crime suspects, and informs the public with early warning and ongoing coverage concerning emergencies and disasters such as fires, earthquakes, storms, terrorism, and other threats. Reliable transmission of these news stories can be vital for ensuring public safety. Besides news, television stations often provide entertainment, such as real time feeds of ongoing special events. Sporting games, parades, and live performances happening across the street or around the world are conveniently viewable at home thanks to these broadcasts. However, before these broadcasts reach their final destination at the viewer's television, they must first be recorded from cameras, often far away from the television studio. Thus, different techniques and devices have been developed to accomplish the task of transferring the camera footage to a desired location, usually a television station studio, to be disseminated to the wider public.

Electronic News Gathering (ENG) is an acronym that generally describes the process of a newscaster or television crew going out and covering a news story. One method used for video footage transfer in ENG is transmission through short-range direct line of sight microwaves. Generally, a vehicle such as a truck or van is specially modified with video equipment and a microwave transmission dish. The microwave transmission dish is often mounted on a telescoping mast that can rise about fifty feet into the air to achieve direct line of sight with a receive tower. The vehicle itself may also receive short-hop signals from, for example, portable cameras. Video production and editing equipment in the vehicle might be used to prepare video footage for broadcast. From that point, the edited video or raw footage may be sent via microwave transmission to a relay tower or directly to a central receive tower at the home studio. The relay towers might be strategically placed throughout the desired coverage area to allow greater reporting distance from the home studio.

Although microwaves work well when there is a clear and unobstructed path, if there is sufficient interference from, for example, adverse weather conditions, line of sight barriers, and interfering microwaves on nearby frequencies, microwave signal quality may degrade to the point of uselessness. In particular, the availability of microwave spectrum frequencies is extremely limited, requiring news agencies to carefully coordinate their microwaves not to interfere with each other. Regulations also limit the amount of microwave energy allowed for broadcast, further limiting microwave signal integrity. Thus, microwave transmission is not a completely reliable method of transfer, especially when operating far away from the central receive tower.

Another common method of transfer used by ENG is satellite communications. The specially modified vehicle previously mentioned might also be equipped with a satellite dish to supplant or complement the existing microwave transmission capabilities. The satellite dish is pointed skywards to a geostationary satellite, data is sent to the satellite, and the satellite relays that data back to the home studio. Thus, distance from the central receive tower is no longer a concern, as long as there is a clear path to the satellite. However, satellites suffer from similar transmission availability problems as microwave, such as limited satellite lifetime, limited frequency availability, interference, malfunction downtimes, and signal loss susceptibility in adverse weather conditions. Thus, satellite communications still inherit many unaddressed reliability concerns.

Accordingly, there is a need to overcome the drawbacks and deficiencies in the art by providing a way for video footage and other digital data to be reliably transferred from a remote location to desired destinations.

SUMMARY OF THE INVENTION

A digital repeater module and method for relaying digital data, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 4 shows a flowchart describing the steps, according to one embodiment of the present invention, by which a digital repeater module may relay digital data.

DETAILED DESCRIPTION OF THE INVENTION

The present application is directed to a digital repeater module and method for relaying digital data. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
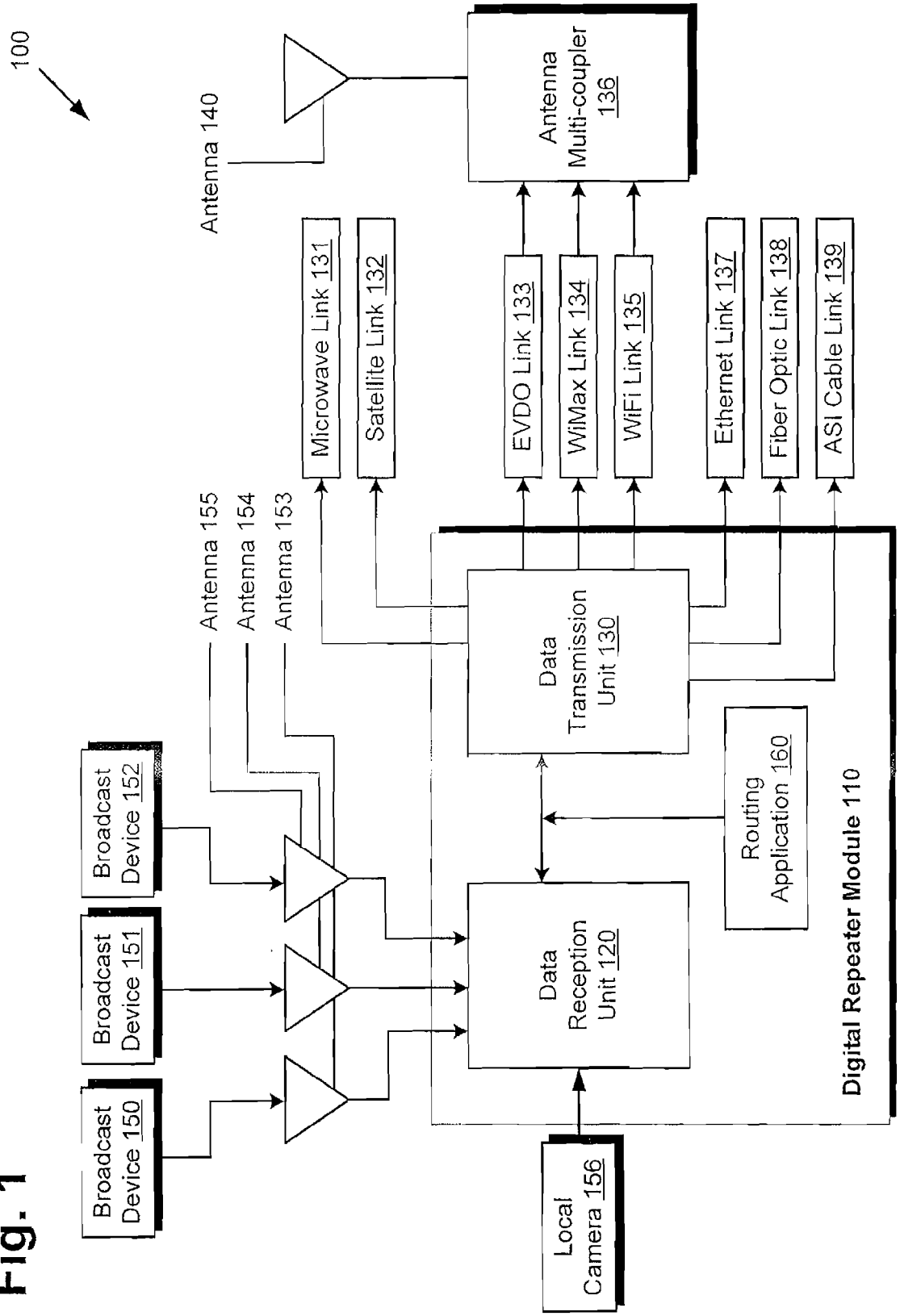
FIG. 1 presents a diagram of a digital repeater module, in accordance with one embodiment of the present invention.

FIG. 1 presents a diagram of a digital repeater module shown in the context of a digital repeater environment, in accordance with one embodiment of the present invention. Digital repeater environment 100 includes digital repeater module 110, local camera 156, antenna multi-coupler 136, antennas 140, 153, 154, and 155, and broadcast devices 150, 151, and 152. Digital repeater module 110 includes data reception unit 120, data transmission unit 130, and routing application 160. Routing application 160 controls the flow of data between data reception unit 120 and data transmission unit 130. Connected to data reception unit 120 are antennas 153, 154, and 155, which receive broadcasts from broadcast device 150, 151, and 152, respectively. Local camera 156 is also connected to data reception unit 120. Connected to data transmission unit 130 are various communication protocol links, including microwave link 131, satellite link 132, Evolution Data Only/Evolution Data Optimized (EVDO) link 133, Worldwide Interoperability for Microwave Access (WiMax) link 134, WiFi link 135, Ethernet link 137, fiber optic link 138, and Asynchronous Serial Interface (AST) cable link 139. Antenna multi-coupler 136 is connected to EVDO link 133, WiMax link 134, and WiFi link 135 and allows these protocols to share the same antenna 140.

For the sake of clarity, FIG. 1 is lacking certain implementation details such as particular hardware embodiments, microprocessors, storage devices, power supplies, and other details. The selection and configuration of appropriate supporting hardware is well known in the art. One particular point that may merit some discussion is the redundancy of the power supply. Since high availability of digital repeater module 110 is important for reliable data communications, a digital repeater module power supply (not shown in FIG. 1) might be supported by backup power systems, including, for example, a battery backup or a solar panel generator (also not shown in FIG. 1). This may be especially important in situations involving national security or public safety.

For the present example, consider a hypothetical television station named KXYZ, which owns or has the rights to use the equipment and communication links shown in FIG. 1. Broadcast devices 150, 151, and 152, might then, for example, represent microwave equipped ENG vehicles with video editing and camera equipment. However, in another embodiment, the broadcast devices might also include independent wireless portable cameras, which can connect to an uplink wirelessly without relying on an ENG vehicle as an uplink relay. In other embodiment, any device that can leverage an enhanced ability to transport data reliably might also be utilized a broadcast device candidate, although for the sake of simplicity, FIG. 1 illustrates microwave equipped ENG vehicles as an example of broadcast devices. For example, a wireless laptop could be used as a broadcast device, leveraging an enhanced ability to exchange files with the home studio to improve collaboration and productivity.

Continuing with the present example, there might be three breaking stories in the area close to digital repeater module 110, so broadcast devices 150, 151, and 152 are concurrently covering each of the stories. Each of the broadcast devices then orients their microwave dish towards data reception unit 120 of digital repeater module 110. Although the present example utilizes directional microwaves, modern microwave transmission techniques such as coded orthogonal frequency-division multiplexing (COFDM) might circumvent the need for a direct line of sight, dispensing with the directional orientation step necessary for a directional microwave dish. This alternative technique can often be used in highly mobile broadcast environments such as motorcycles and helicopters, where it may be impractical to constantly realign the broadcast antenna due to positional movement.

In FIG. 1, the example directional microwaves from the broadcast devices are connected to three separate reception antennas, e.g. antennas 153, 154, and 155. Three antennas are chosen simply to emphasize the multiple input capability of data reception unit 120; there can be more or less antennas, or it could comprise a smart antenna array or some other advanced configuration capable of receiving multiple inputs. In addition, although data reception unit 120 in this example is receiving data primarily from microwave broadcasting devices used in ENG applications, data reception unit 120 may potentially receive inputs from several different transmission protocols, depending on the desired application.

One alternative input that data reception unit 120 might receive from is local camera 156, which may be connected to data reception unit 120 through a direct cable connection or a short-hop wireless link, for example. Since high bandwidth microwave transmission requires a direct line of sight, digital repeater module 110 might be placed in a position for high antenna visibility such as the rooftop of a building. Although modern microwave techniques such as COFDM may avoid the need for direct line of sight, compatibility with existing equipment might still favor placement at high vantage points. Often, this placement is also advantageous for taking panoramic views of surrounding events, which is where local camera 156 may prove to be useful. Local camera 156 might have various positioning and angle adjustments built into it, allowing for flexible focus on areas of interest. To control these adjustments, data reception unit 120 might issue commands to local camera 156 to adjust its height, angle, zoom, and focus. Those commands might originate from a remote location, such as from an Internet web interface hosted at the KXYZ studio, or from one of the broadcast devices 150, 151, and 152.

Although the connections to data reception unit 120 are portrayed as one-way in FIG. 1, this is only to emphasize the predominant direction of data transfer and does not preclude bidirectional communication such as the camera adjustment commands discussed above. Depending on the requirements of the ENG teams and the unavailability of other communication links, data reception unit 120 might even send significant amounts of data back to broadcast devices 150, 151, and 152. Thus, data reception unit 120 and data transmission unit 130 might both be individually referred to as all-in-one data reception and transmission units. However, they are separated as a reception unit and a transmission unit to emphasize the predominant direction of data transfer, which is often vital for configuring the implementing hardware. For example, antennas configured for optimal reception are often poorly configured for optimal transmission, and vice versa. Thus, if the ENG teams require large amounts of data to be sent back to broadcast devices 150, 151, and 152, data transmission unit 130 should be preferred to data reception unit 120, if appropriate communications links are available.

Data transmission unit 130 is configured to be as flexible as possible in the number of different transmission protocols it can understand and use. As previously mentioned, data transmission unit 130 may be capable of bidirectional communication but is optimized for transmitting data. In the present example, there are eight (8) possible communication links data transmission unit 130 can utilize, but another embodiment may support a different configuration of multiple communication links. In FIG. 1, the communication links are separated into three different groups. The top group consists of microwave link 131 and satellite link 132, which represent the traditional methods of communication for ENG vehicles and cameras. These links may use a dish antenna to transmit signals. The middle group consists of EVDO link 133, WiMax link 134, and WiFi link 135, representing various wireless radio protocols. In this particular embodiment, they are configured to share the same antenna 140 through the use of antenna multi-coupler 136. Antenna 140 might consist of a smart antenna array that can reconfigure itself for the most appropriate method of transmission. The bottom group consists of Ethernet link 137, fiber optic link 138, and ASI cable link 139, which represent wired connector communications. These wired connectors may further connect to a local area network (LAN), which in turn may connect to a wide area network such as the Internet.

Routing application 160 contains the logic to route data from data reception unit 120 through data transmission unit 130 based on some determined transmission metrics. These metrics might comprise, for example, speed of transfer, latency, link reliability, power consumption, and cost performance. One particular metric might be isolated if it is of prime importance, for example, maximization of link reliability. Alternatively, a combination of weighted metrics might be used to assign relative importance to certain metrics. Metrics might also be selected based on the content of transmission; for example, emergency broadcasts might prioritize speed of transfer and link reliability, whereas entertainment broadcasts might emphasize latency and cost performance. These selected metrics are the relevant measure of interest when data paths of "optimal" or "sub-optimal" performance are referred to in this specification. More details about the operation of routing application 160 shall be deferred for the discussion of FIG. 4 below.

Figure 2:
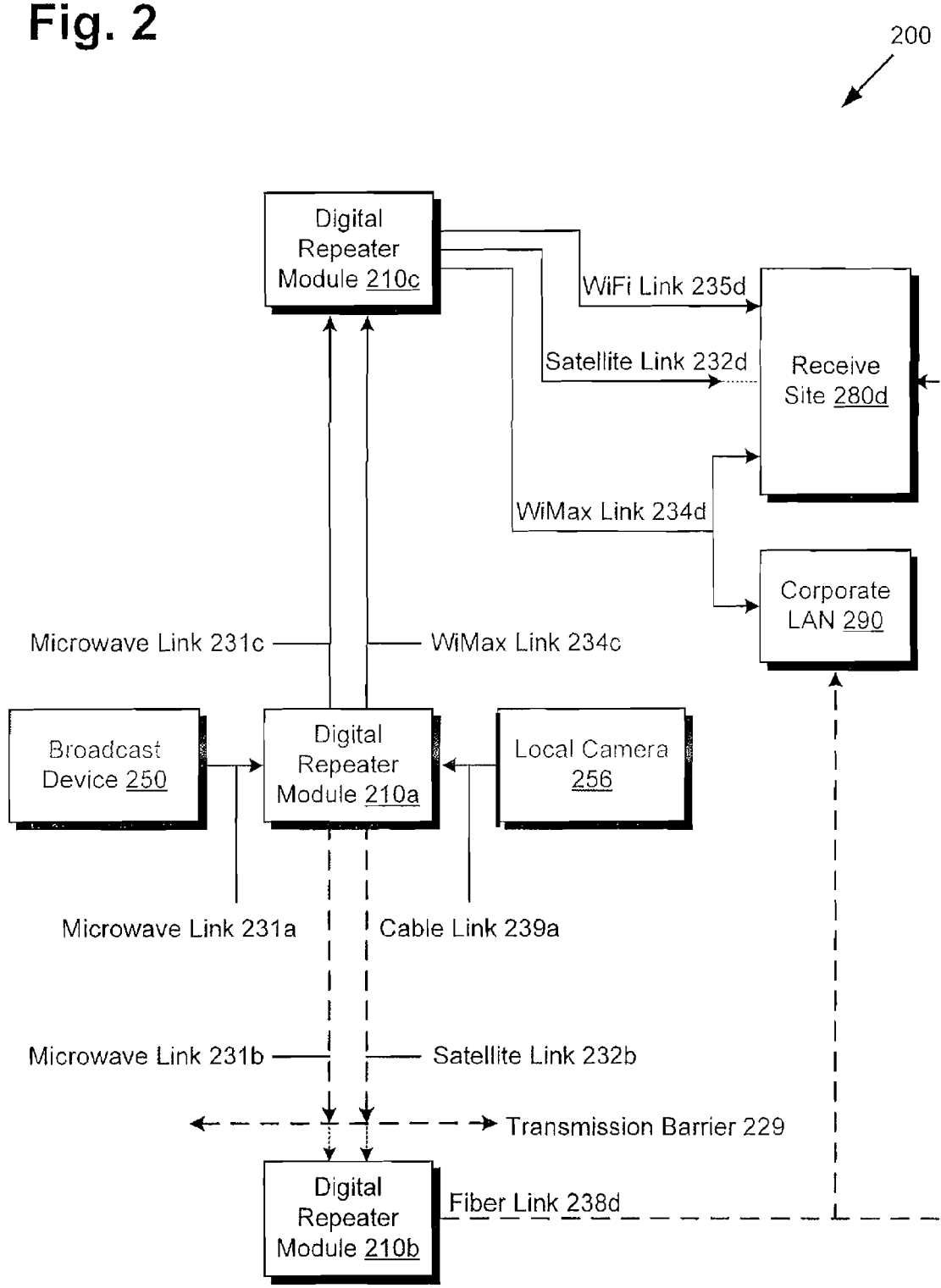
FIG. 2 presents a digital repeater system including multiple digital repeater modules for relaying digital data, in accordance with one embodiment of the present invention.

Now that a single digital repeater module has been introduced, FIG. 2 presents a digital repeater system including multiple digital repeater modules for relaying digital data, in accordance with one embodiment of the present invention. Digital repeater system 200 includes broadcast device 250, digital repeater modules 210*a*, 210*b*, and 210*c*, local camera 256, receive site 280*d*, and corporate LAN 290. Broadcast device 250 corresponds to broadcast devices 150, 151, and 152 from FIG. 1, and it can communicate with digital repeater module 210*a* by microwave link 231*a*. Local camera 256 corresponds to local camera 156 in FIG. 1, and can communicate with digital repeater module 210*a* by cable link 239*a*. Digital repeater modules 210*a*, 210*b*, and 210*c* correspond to digital repeater module 110 in FIG. 1. Digital repeater module 210*a* can communicate with digital repeater module 210*b* by microwave link 231*b* and satellite link 232*b*, but transmission barrier 229 is causing signal integrity problems as indicated by the dotted lines. Digital repeater module 210*a* can also communicate with digital repeater module 210*c* by microwave link 231*c* and WiMax link 234*c*. Digital repeater module 210*b* can communicate with receive site 280*d* and corporate LAN 290 by fiber link 238*d*, which is available but unused as indicated by the clashed line. Digital repeater module 210*c* can communicate with receive site 280*d* by WiFi link 235*d*, satellite link 232*d*, and WiMax link 234*d*, although satellite link 232*d* is shown to have some transmission problems indicated by the dotted line. Digital repeater module 210*c* can also communicate with corporate LAN 290 by WiMax link 234*d*.

Continuing with the KXYZ station example, broadcast device 250 from FIG. 2 may represent a microwave equipped ENG vehicle. Only one broadcast device is presented in FIG. 2 to simplify the explanation of digital repeater system 250; there might be many concurrent broadcast devices as in FIG. 1. Receive site 280*d* might represent the KXYZ television studio, where video footage must arrive before being broadcast to the public. Corporate LAN 290 might represent the business network of KXYZ executives located in a nearby business suite, but separate from the television studio. These KXYZ executives might want the ability to monitor the video footage generated from broadcast device 250. Thus, FIG. 2 illustrates the situation where data from broadcast device 250 is to be sent concurrently to receive site 280*d* and corporate LAN 290. Since the footage will be broadcast the same day it is taken, the KXYZ engineers decide to emphasize transfer speed and link reliability as the transmission metrics for selecting optimal data paths. Digital repeater modules 210*a*, 210*b*, and 210*c* will coordinate how that is accomplished.

Starting from the origin of the digital data, a news story may have been recorded and produced at the ENG vehicle that represents broadcast device 250. Continuing the KXYZ example, KXYZ news crew including popular KXYZ news personality Bernard Blintz are covering a political protest in progress near broadcast device 250. A wireless portable camera records and digitizes ten minutes of raw video and audio footage and relays the footage back to the ENG vehicle for post-processing. Furthermore, the wireless portable camera or the equipment at the ENG vehicle might compress the video and audio streams into, for example, MPEG-2 or MPEG-4 formats to accommodate bandwidth and data storage constraints while maintaining the human perceived quality of the video. Encryption might also be applied to the data to prevent unauthorized third parties from intercepting or modifying the data.

At the ENG vehicle corresponding to broadcast device 250 in FIG. 2, the video editing crew splice the ten minutes of raw footage into a three-minute segment suitable for the allotted time in the KXYZ evening news program, applying KXYZ logos, text overlays, transition effects, and otherwise preparing the segment for prime time. This post-processing step might be deferred for the crew at the home studio instead, or the raw video data might be transmitted in real-time for "live" news coverage, but broadcast device 250 in the present example will be setup to transmit a prepared and prerecorded file. Thus, a digital data file named "BERNARD.MPEG" might represent the three-minute Bernard Blintz segment covering the political protest. As mentioned, as both the corporate executives and the television studio may be interested in this file, according to the present example, BERNARD.MPEG can be sent to both receive site 280*d*, the television station, and corporate LAN 290, where the executives are located.

At the same time Bernard Blintz is on the ground covering the political protest, local camera 256 might be capturing an aerial view of the sprawling protest crowd. As previously discussed, digital repeater module 210*a* might be ideally located on a rooftop to maximize antenna visibility, which in turn makes it an ideal vantage point for local camera 256. Local camera 256 might be adjustable through remote commands issued by, for example, broadcast device 250. Since broadcast device 250 is not optimized for receiving data, it might receive a low bandwidth video feed of local camera 256 through microwave link 231*a* to act as a remote viewfinder. This video feed can help broadcast device 250 to send proper camera adjustment commands to local camera 256 for focusing on areas of interest; in this case, the protest crowd. Similar to the wireless camera, local camera 256 might provide digital repeater module 210*a* with a compressed video file named "CROWD.MPEG" which may be distributed in a similar manner as BERNARD.MPEG.

Since the news story may be happening far away from receive site 280*d*, broadcast device 250 may be out of range for direct microwave transmission. In the present example, broadcast device 250 can only communicate by a limited range microwave link, so this may pose a problem. However, the presence of digital repeater module 210a within microwave link range, in the present embodiment, provides a solution to that problem not met by the conventional art. Although three digital repeater modules are shown as available in FIG. 2, for the purposes of the present example let us assume that only digital repeater module 210a is close enough to receive a signal from broadcast device 250. Thus, broadcast device 250 is oriented towards digital repeater module 210a and transmits BERNARD.MPEG. After receiving BERNARD.MPEG, digital repeater module 210a might temporarily cache BERNARD.MPEG on a local storage device such as flash memory. After digital repeater module 210a is finished relaying BERNARD.MPEG, this cache might be flushed to free space on the storage device. The desired destinations, i.e., receive site 280d and corporate LAN 290, might be predetermined at the time of initial transfer, or the destinations themselves might initiate a request for the offered file after receiving an offer notification that BERNARD.MPEG is being distributed by broadcast device 250. This notify-request system might be implemented using a software monitoring client that is installed at potential destinations such as receive site 280d and corporate LAN 290. Even broadcast device 250 might be equipped with the software; for example, it may want to receive the CROWD.MPEG file generated by local camera 256. However, the practicality of adding such a feature might be limited by the data reception capabilities of broadcast device 250. In the present example, broadcast device 250 is configured primarily for transmission, so using the data reception software there might be ill advised.

From digital repeater module 210a, the files BERNARD.MPEG and CROWD.MPEG can be relayed to either digital repeater module 210b or digital repeater module 210c. Digital repeater module 210a might first decide to evaluate the paths to digital repeater module 210b shown by microwave link 231b and satellite link 232b. However, when determining the transmission metrics of these links, the routing application of digital repeater module 210a discovers that the signal integrity and transfer speeds for microwave link 231b and satellite link 232b are very poor clue to transmission barrier 229, which might represent localized adverse weather conditions between the link paths. Although these particular links are performing poorly at the time, the overall data paths are not completely useless as fiber link 238d is available to digital repeater module 210b as indicated by the dashed lines, supporting fast and reliable transfers. Transmission barrier 229 will disappear when the weather clears up, so these particular data paths might be noted by the routing application for future use.

The routing application of digital repeater module 210a may then decide to explore the other available connections: microwave link 231c and WiMax link 234c. These connections do not encounter any signal interference problems and digital repeater module 210c reports excellent signal quality to digital repeater module 210a. At this point, however, digital repeater module 210a defers the decision on which paths to select, since there are still some unknown remaining data paths.

If the digital repeater modules were configured to consider only the nearest neighbors, then the decision to transfer to digital repeater module 210c could be made already. However, the digital repeater modules may need to consider the overall network topology rather than just the nearest neighbors when planning data paths, since problems such as cycles (endless loops) or suboptimal routes may otherwise result. As an example of a suboptimal route, an algorithm routing to the nearest optimal neighbor might result in data transmitting to digital repeater module 210c due to the presence of transmission barrier 229 before digital repeater module 210b. However, if all outgoing data pathways from digital repeater module 210c were somehow rendered unavailable, the route that appeared optimal at first would be a dead end and possibly require backtracking. An optimal route might go to digital repeater module 210b instead, even with transmission barrier 229, since a weak signal is better than no signal.

To avoid suboptimal routes, the digital repeater modules might learn network topology data from each other on an ad-hoc peer-to-peer basis, for example, or the network topology data might be managed in a more centralized fashion. This way, the digital repeater modules can plan optimal data paths multiple steps ahead. In one embodiment, digital repeater module 210a is configured to plan an optimal data path all the way to the final destination. Methods for creating and maintaining this network topology data are well known in the art.

Thus, the routing application must still determine three paths of unknown signal integrity: WiFi link 235d, satellite link 232d, and WiMax link 234d. WiFi link 235d and WiMax link 234d indicate no problems, but satellite link 232d seems to be down as indicated by the dotted line. This situation might represent, for example, a satellite that is taken out of orbit, having been struck by a big piece of space debris. Digital repeater module 210a might inquire digital repeater module 210c as to the available data paths, and digital repeater module 210c might respond with WiFi link 235d and WiMax link 234d, along with their transmission metrics. This peer-to-peer information exchange might facilitate the process of building the network topology data as previously discussed. At this point, no other avenues of communication are known to be available, so digital repeater module 210a parses the data paths it has available using the routing application and selects data paths emphasizing transfer speed and link reliability.

Thus, digital repeater module 210a will decide to transfer BERNARD.MPEG and CROWD.MPEG to digital repeater module 210c. However, as indicated by FIG. 2, there are two paths available; microwave link 231c and WiMax link 234c. Digital repeater module 210a will need to make a decision on how to use these available links using the routing application. In a typical configuration, only one data link would be selected, and the other available links would remain idle. However, digital repeater module 210a can be configured to utilize all paths available to it concurrently.

For the purposes of the present example, a mirrored data path method, in which mirrored copies of the same data are sent across all data paths, will be used to increase data transfer reliability while simplifying the burdens on the routing application. Thus, a duplicate copy of both BERNARD.MPEG and CROWD.MPEG will be sent across both microwave link 231c and WiMax link 234c. Other methods could be adopted or even adaptively selected based on the current metric emphasis. For example, if power consumption is selected as a high priority metric, certain watt expensive paths may not be used concurrently unless justified by a greater performance or reliability gain. On the other hand, if transfer speed is the highest priority with link reliability being a lesser concern, another method for concurrent data transmission may be selected. As the emphasis on the metrics change, the routing application may correspondingly adjust its concurrent link strategies.

Returning to the present example, digital repeater module 210c now has a copy of BERNARD.MPEG and CROWD.MPEG cached in its local storage device. Depending on the aggressiveness of the caching algorithm and the capacity of the storage device, digital repeater module 210*a* might take the opportunity to flush BERNARD.MPEG and CROWD.MPEG from its local cache. However, it may be deemed beneficial to keep cached copies at different digital repeater modules for as long as possible, at least until the data has filially readied its destination. This way, should certain data links go down and alternative data links need to be pursued, suboptimal retransmission of data may be avoided as the file would already exist in some of the digital repeater modules closer to an optimal path.

As previously mentioned, satellite link 232*d* was determined to be unavailable, so only WiFi link 235*d* and WiMax link 234*d* are available for digital repeater module 210*c* to use. However, WiMax link 234*d* is depicted having two branching arrows going to both receive site 280*d* and corporate LAN 290. Fiber link 238*d* is also depicted in FIG. 2 as having a similar capability. This illustrates another transmission capability of the digital repeater modules: sending concurrently to multiple targets, or multicasting. Digital repeater module 210*c* can concurrently send copies of BERNARD.MPEG and CROWD.MPEG to both receive site 280*d* and corporate LAN 290. Conventional unicast transfer, on the other hand, must send two identical copies sequentially, placing a greater bandwidth burden on the communications link and requiring a longer transfer time. Combining this multicast capability with the ability to use multiple communications links, digital repeater module 210*c* could send BERNARD.MPEG and CROWD.MPEG to receive site 280*d* using mirrored data across both WiFi link 235*d* and WiMax link 234*d*, while concurrently sending those same data files to corporate LAN 280*d* over singular WiMax link 234*d*. After this step is complete, receive site 280*d* and corporate LAN 290 will both have access to local copies of BERNARD.MPEG and CROWD.MPEG. At this point, a message might be propagated throughout the digital repeater modules informing them that the data reached its destination successfully and that it is safe to flush BERNARD.MPEG and CROWD.MPEG from their local caches.

With the data arriving safely at its destinations, the KXYZ executives using corporate LAN 290 can easily view the BERNARD.MPEG segment as well as the CROWD.MPEG. Pleased with the footage, the executives give the studio crew permission to air the segment. At receive site 280*d*, the studio crew might splice in segments of CROWD.MPEG into BERNARD.MPEG to add dramatic impact, and otherwise polish the segment so that it is ready for prime time broadcast. Thanks to digital repeater system 200 of FIG. 2, the KXYZ news team was able to cover a news story that might have been otherwise outside their usual operating range.

Figure 3B:
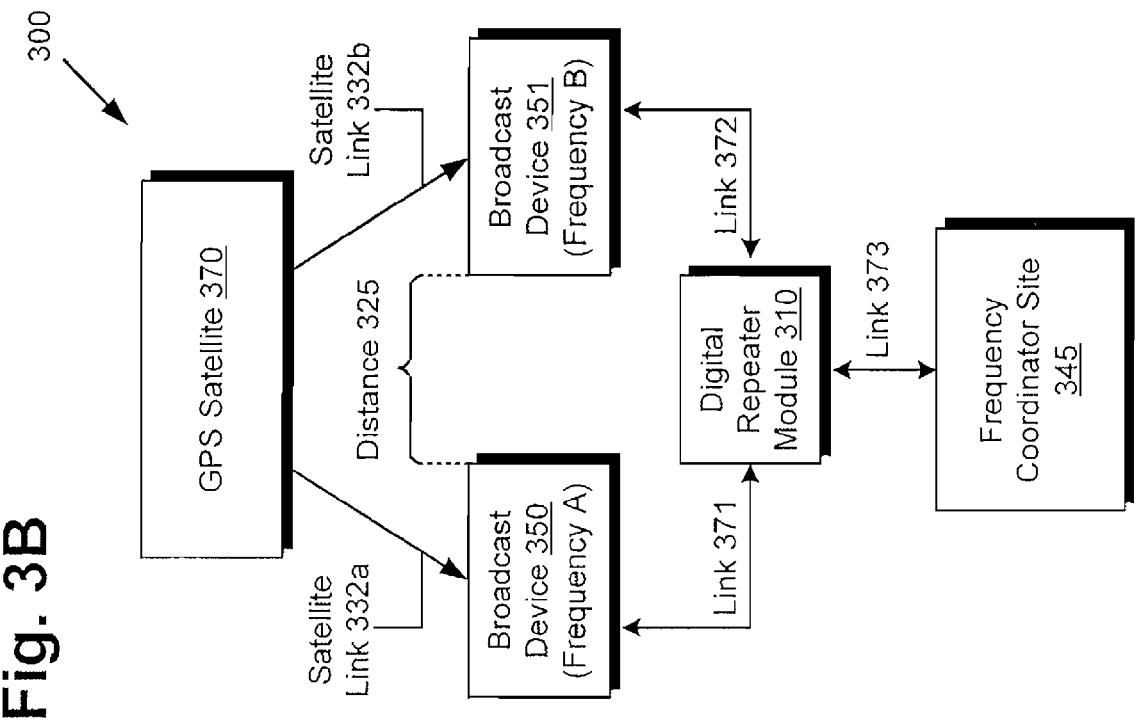
FIGS. 3A and 3B present a block diagram at two points in time showing in greater detail an exemplary digital repeater module by which limited broadcast frequencies may be assigned to broadcast devices by the digital repeater module.
Figure 3A:
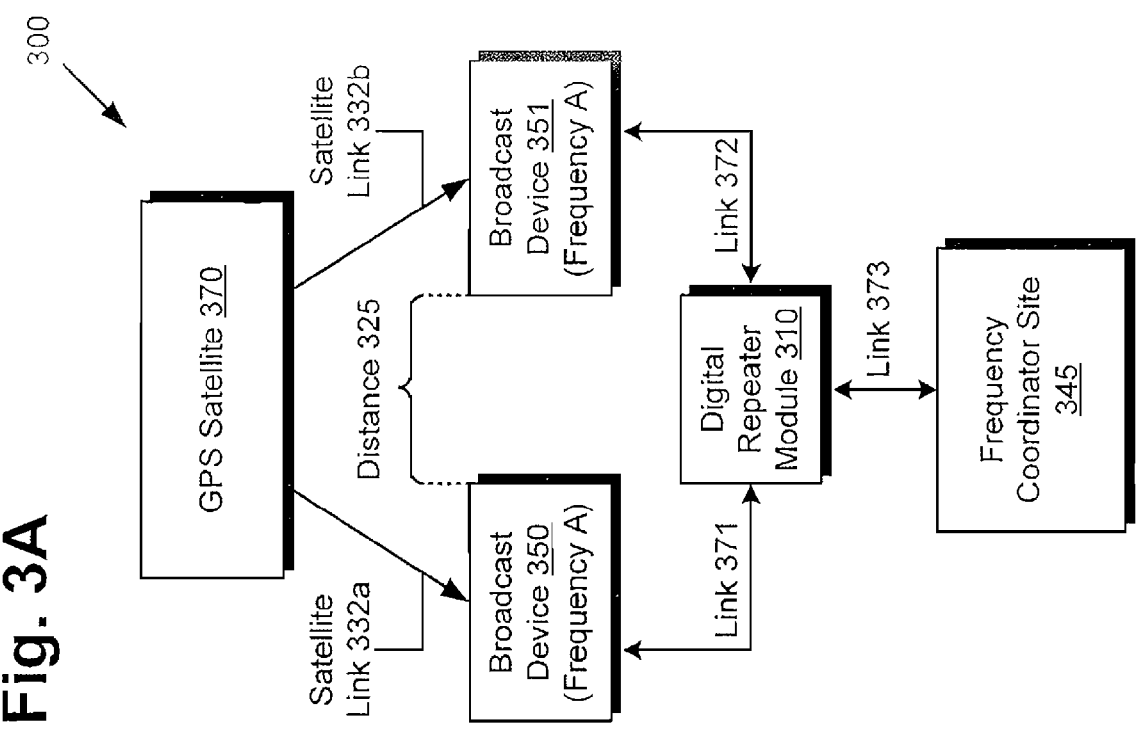

Moving to FIGS. 3A and 3B, FIGS. 3A and 3B present a block diagram at two points in time showing in greater detail an exemplary digital repeater module by which limited broadcast frequencies may be assigned to broadcast devices by the digital repeater module. In a crowded and competitive news environment with limited useable spectrum bands, each television station will have only a small subset of frequencies to use. If equipment is not coordinated properly, nearby equipment on similar frequencies may cause unwanted interference. To that end, digital repeater module 310 shown in FIGS. 3A and 3B operates to facilitate the assignment of these limited broadcast frequencies.

Examining FIGS. 3A and 3B in greater detail, FIG. 3A represents a point in time where frequency interference may be imminent; FIG. 3B represents a point in time after frequencies are reassigned. Digital repeater environment 300 includes GPS (Global Positioning System) satellite 370, broadcast devices 350 and 351, digital repeater module 310, and frequency coordinator site 345. Broadcast devices 350 and 351 correspond to broadcast devices 150, 151, and 152 from FIG. 1. Digital repeater module 310 corresponds to digital repeater module 110 from FIG. 1. UPS satellite 370 can communicate with broadcast devices 350 and 351 through satellite links 332*a* and 332*b*, respectively. Digital repeater module 310 can communicate with broadcast device 350, broadcast device 351, and frequency coordinator site 345 through links 371, 372, and 373 respectively. Distance 325, not drawn to scale, represents the distance between broadcast devices 350 and 351.

The systems shown in FIGS. 3A and 3B are simplified for illustrative purposes. For example, although only one GPS satellite is depicted, in practice, GPS location data is usually calculated through data from multiple GPS satellites to improve positioning accuracy. Similarly, only two broadcast devices and one receive site are depicted, even though digital repeater module 310 could be transferring through many more inputs and outputs, and multiple digital repeater modules might coexist as illustrated in FIG. 2. Additionally, since the particular method of communication is not crucial for the present illustration, links 371, 372, and 373 are presented as bidirectional generic links that might be considered always available.

Continuing with the KXYZ example, broadcast devices 350 and 351 could represent microwave equipped ENG vehicles owned by KXYZ, and frequency coordinator site 345 could represent a room within the KXYZ studio, located at receive site 280*d* in FIG. 2. Frequency coordinator site 345 might include a team of KXYZ engineers, spectrum analysis equipment, and other tools for maintaining frequency assignment of KXYZ broadcast devices, for example. GPS satellite 370 provides location tracking data to broadcast devices 350 and 351 through satellite links 332*a* and 332*b*. GPS receive capability might be added to broadcast devices 350 and 351 by an add-on GPS receiver or by an interface module utilizing a preinstalled GPS receiver in the ENG vehicle. If broadcast devices 350 and 351 are wireless cameras instead, a GPS attachment module might connect to the wireless cameras via a user data channel.

Broadcast devices 350 and 351 are shown in FIG. 3A to broadcast on the same frequency A. This could potentially cause interference problems if distance 325 becomes too short. In order to detect this, frequency coordinator site 345 will need updated information about the position and frequency of the broadcast devices. Broadcast devices 350 and 351 might retrieve their current position from GPS satellite 370 and periodically forward that GPS information along with frequency data to digital repeater module 310. Digital repeater module 310 could then relay that GPS information and frequency data to frequency coordinator site 345. Using the GPS information and frequency data gathered from broadcast devices 350 and 351 and other broadcast devices KXYZ might own, frequency coordinator site 345 could implement an advanced warning system.

For example, one advanced warning system could simply set a maximum threshold distance and trigger a warning should the distance between two potentially interfering broadcast devices drop below that threshold. Another method might divide the area to be monitored into discrete areas, triggering a warning if two broadcast devices with the same frequency are in the same discrete area. A more sophisticated system based on predictive movement patterns might be used to minimize false warnings and defer frequency changes until absolutely necessary. Alternatively, the system may focus on providing information rather than making decisions, relying on human judgment to decide when a warning is proper. For the KXYZ example, the simple maximum threshold method will be used.

When frequency coordinator site 345 does decide to issue a warning, it must then decide a course of action to take—for example, changing the frequency of a broadcasting device, turning off a broadcasting device, or just ignoring the warning in anticipation that that the devices will move apart, rendering the warning moot. This step might be assisted by human judgment; for example, the locations and frequencies of the broadcast devices could be displayed on a visual map for a human frequency controller to monitor. The human frequency controller could approve or override a course of action suggested by an automated system, or manually direct the actions to take. Due to the scarce number of frequencies available, there may be situations where one broadcast device must be turned off. Since the decision to favor one broadcasting device over another is not easily determined automatically, human judgment may be especially important at this step. Coverage of one story might be more important than another, one ENG vehicle might be better equipped than another, or a particular news team might be preferred to operate in a certain area versus another team. These sensitive decisions might require the human insight of KXYZ personnel. For the present example, this human aided system will be used to make the final judgment.

Continuing with the KXYZ example, frequency coordinator site 345 might have recently received a periodic GPS and frequency data update from broadcast device 350. Based on information already previously received from broadcast device 351, distance 325 is calculated to be under the maximum threshold allowed before a warning is issued, and such a warning is issued. The human frequency controller is presented with the warning, and decides to change the frequency of broadcast device 351. Using spectrum analysis equipment and determining open frequencies, the human frequency controller is able to select an available frequency, frequency B, to reassign to broadcast device 351.

To update broadcast device 351, the instruction to change to frequency B must travel from frequency coordinator site 345 to broadcast device 351. In FIG. 3A, this can be accomplished by sending the instruction via link 373 to digital repeater module 310, which in turn relays the instruction to broadcast device 351 using link 372. After broadcast device 351 receives the instruction to change frequencies, it might automatically proceed to change its frequency configuration, or wait for permission to change from the ENG crew. Once this change is accepted, it might also be propagated via a Data Return Link (DRL) to any local short-hop wireless cameras that rely on broadcast device 351 for the uplink to the television station. Alternatively, broadcast device 351 might represent a wireless portable camera directly, rather than an ENG vehicle. After the frequency change is effected, FIG. 3B will illustrate the updated status of digital repeater system 300, with broadcast device 351 now using frequency B, free of conflicts with broadcast device 350.

With this GPS-based frequency reassignment system in place, KXYZ can now preemptively deal with potential inference problems rather than reacting to them when they actually happen. Since GPS satellites are specialized and do not provide a general data network, the digital repeater module plays a central role in relaying data from multiple GPS receivers into a single location for analysis. Although maintaining this system might increase maintenance costs for KXYZ, the productivity savings in avoiding interference problems will likely outweigh these maintenance costs.

Now that the digital repeater module has been introduced in various system configurations, FIG. 4 presents a flowchart describing in greater detail the steps, according to one embodiment of the present invention, by which a digital repeater module may relay digital data. Certain details and features have been left out of flowchart 400 that are apparent to a person of ordinary skill in the art. For example, a step may comprise one or more substeps or may involve specialized equipment or materials, as known in the art. While steps 402 through 410 indicated in flowchart 400 are sufficient to describe one embodiment of the present invention, other embodiments of the invention may utilize steps different from those shown in flowchart 400.

Referring to step 402 of flowchart 400 in FIG. 4 and digital repeater environment 100 of FIG. 1, step 402 of flowchart 400 comprises digital repeater module 110 receiving digital data through data reception unit 120. As illustrated by FIG. 1, data reception unit 120 can concurrently receive data from numerous different devices using different protocols. For the purposes of the present example, only one data source will be considered. In the present example, broadcast device 150 represents a microwave transmitting ENG vehicle broadcasting digital video data, antenna 153 represents a microwave reception antenna, and data reception unit 120 represents coordinating hardware that enables concurrent data input. Broadcast device 150, corresponding to broadcast device 250 in FIG. 2, sends data to antenna 153, which receives the signal and provides it to data reception unit 120.

Continuing with step 404 in FIG. 4 and digital repeater environment 100 of FIG. 1, step 404 of flowchart 400 comprises identifying, using routing application 160, available data paths for relaying the data received in step 402 to desired receive locations. Referring to digital repeater system 200 of FIG. 2, digital repeater modules 210a, 210b, and 210c correspond to digital repeater module 110 in FIG. 1. Thus, a routing application is also included in each digital repeater module. As previously discussed, the desired receive locations might be included at the same time the data is received, or they could be determined by an offer-request system. For the present example, receive site 280d and corporate LAN 290 are included as the desired receive locations.

As previously discussed, the routing application of digital repeater module 210a will need to have some information about the network topology to plan routes beyond its immediate surroundings. To determine this network topology, digital repeater module 210a requests available route information from repeater modules 210b and 210c. To facilitate the next step, a request may also be made for corresponding transmission characteristics of the routes. Although the network only consists of three digital repeater modules in FIG. 2, if there are additional digital repeater modules available, there might be additional information requests spreading out through the network. When these route requests are answered, they might also be tagged with a unique route identifier for future use by the digital repeater modules, circumventing the need to include the entire path structure when relaying data. This ad-hoc information gathering system might be augmented or supplanted by a more centralized system, as previously mentioned. After generating information about the network topology, digital repeater module 210a can determine the data paths available to route the data, as represented by the link arrows in FIG. 2.

At step 406 of flowchart 400, the routing application of digital repeater module 210a will determine transmission characteristics for each of the data paths identified in step 404. If in step 404, transmission characteristics were also requested along with the available data paths, then this step can be completed concurrently with step 404. Otherwise, an additional information request similar to step 404 will need to be executed. A distinctive aspect of step 406 may be the logic required to provide the transmission characteristics. For example, transfer speed can be calculated using a test data transfer, comparing the amount of data transferred to the time elapsed. Link reliability might be extrapolated from, for example, the calculated signal to noise ratio of the receiving antenna, or from uptime history, or from a number of other parameters. Power consumption might be measured with a watt measurement device. Latency might be calculated from timestamp messages, calculating the difference between the sending of data and the reception of data. If these or any other characteristics are worth considering, then corresponding logic to determine those particular characteristics may be embedded into the routing application. For the present example, transfer speed and link reliability will be used, link reliability being calculated from a signal strength calculation.

At step 408 of flowchart 400, the routing application selects a plurality of data paths for transmission based on the transmission characteristics determined from step 406. Referring to FIG. 2, even if fiber link 238*d* provides a fast and reliable link, transmission barrier 229 affects the signal strength to digital repeater module 210 so severely that the paths going to digital repeater module 210*c* will need to be selected instead. As previously mentioned, the present example will use mirrored data transfer as the multiple link strategy for simplicity and reliability. Thus, both microwave link 231*c* and WiMax link 234*c* will be selected in a mirrored data configuration. Since there are no further branching path choices for digital repeater module 210*c* to consider, it will transfer the data using all remaining available data paths. Since satellite link 232*d* is unavailable, it will not be considered. Thus, WiFi link 235*d* and WiMax link 234*d* will be selected in a mirrored data configuration sending to receive site 280*d*. Additionally, WiMax link 234*d* will be selected to multicast data to corporate LAN 290. If WiMax link 234*d* did not support multicasting, then the routing application could failsafe to standard unicast transfer.

At step 410 of flowchart 400, data transmission unit 130 transmits the digital data using the selected plurality of data paths from step 408. Unless the system is a degenerate case where there is only a single digital repeater module or a direct path to the receive site, the data transmission unit will have to rely on the help of other digital repeater modules to relay the data. Thus, step 410 may not travel all data paths in one step. Rather, step 410 will route the data to the most optimal neighbors, passing along route identifiers or path structures to those neighbors, enabling them in turn to correctly route the data along the chosen paths.

Since one reason for adopting the present digital repeater device is the additional reliability it provides for data transfer, contingencies for unexpected issues, such as the failure of a digital repeater device or a downed link for example, may be desirable. In these cases, step 410 may fail midway because a route that was once thought to be valid is now invalid because of missing pathways. In this case, the digital repeater module can be configured to return to step 404 to discover a new path that can circumvent the problem leading to the failure of step 410. If the network provides enough redundancy in the form of additional digital repeater modules and communication links, there are likely to be alternative paths available. Thus, much like the Internet, the repeater network can provide a level of robustness correlated to the number of routers (digital repeater modules) and data paths available. However, if absolutely no paths are available, the digital repeater module may have to wait and periodically check if available paths have opened.

Figure 5:
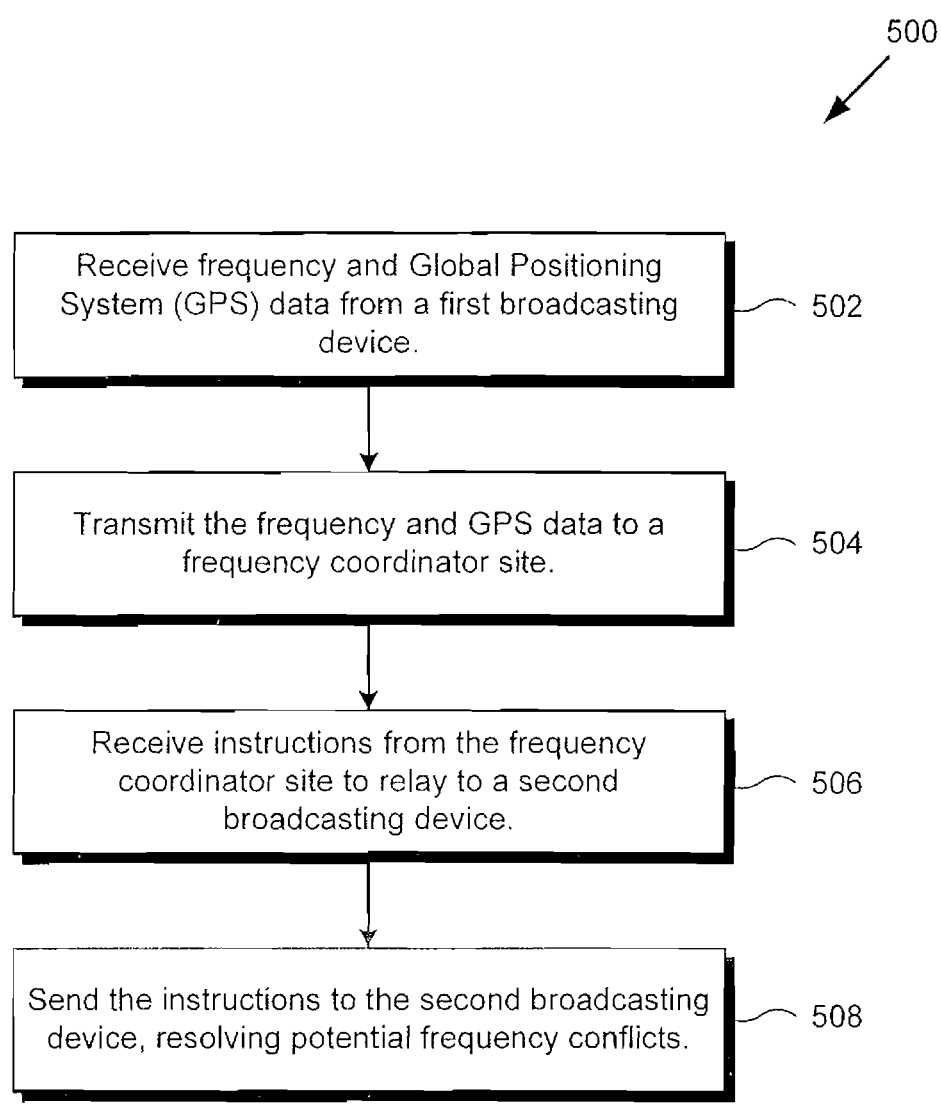
FIG. 5 shows a flowchart describing the steps, according to one embodiment of the present invention, by which a digital repeater module may resolve assignment of limited broadcast frequencies.

Turning to FIG. 5, FIG. 5 shows flowchart 500 describing the steps, according to one embodiment of the present invention, by which a digital repeater module may resolve assignment of limited broadcast frequencies. Certain details and features have been left out of flowchart 500 that are apparent to a person of ordinary skill in the art. For example, a step may comprise one or more substeps or may involve specialized equipment or materials, as known in the art. While steps 502 through 508 indicated in flowchart 500 are sufficient to describe one embodiment of the present invention, other embodiments of the invention may utilize steps different from those shown in flowchart 500.

Referring to step 502 in FIG. 5 and digital repeater system 300 of FIG. 3A, step 502 of flowchart 500 comprises digital repeater module 310 receiving frequency and Global Positioning System (GPS) data from a first broadcasting device, such as broadcast device 350. In one embodiment, for example, broadcast device 350 may have already retrieved a recent GPS data set from GPS satellite 370 through satellite link 332*a*. As previously mentioned, a real world implementation will use multiple GPS satellites, but it is simplified to one satellite in FIG. 3A. Broadcast device 350 will typically also have a frequency already assigned to it, which in FIG. 3A is indicated as frequency A. These data sets may then be transferred from broadcast device 350 to digital repeater module 310 using link 371.

At step 504 of flowchart 500, the frequency and GPS data is transmitted to frequency coordinator site 345. Since FIG. 3A has only one digital repeater module with a direct link 373 to frequency coordinator site 345, this step only involves transmitting data through link 373. However, a more complicated configuration such as digital repeater system 200 shown in FIG. 2 will involve steps similar to flowchart 400 illustrated in FIG. 4 and discussed above.

Steps 502 and 504 will be repeated on a periodic basis for each broadcast device so that the positions of the broadcast devices at the frequency coordinator site do not fall too out of date. The shorter the time length between intervals, the more up-to-date the frequency coordinator site will be. However, a short interval also means more frequent data transfers, increasing the processing overhead for the digital repeater devices. An interval of a few minutes, for example, may effectively balance these competing interests.

At step 506 of flowchart 500, digital repeater module 310 receives instructions from frequency coordinator site 345 to relay to a second broadcasting device, broadcast device 351. In the present example, these instructions comprise changing to frequency B. This instruction can be generated through a multitude of different methods as previously explained in conjunction with FIGS. 3A and 3B; the present system simply compares distance 325 to a preset maximum threshold and triggers a warning to be acted upon by a human decision maker. The decision maker decides to change broadcast device 351 to frequency B. As previously discussed, broadcast device 350 could also be told to change its frequency instead, or either device could be told to shut off instead. According to the present embodiment, frequency coordinator site 345 is responsible for setting up policies to decide the proper course of action.

At step 508 of flowchart 500, digital repeater module 310 sends these instructions received from step 506 to the second broadcasting device, such as broadcast device 351, using link 372, thus resolving potential frequency conflicts. Once broadcast device 351 receives these instructions, it might immediately act upon them or await authorization. As previously explained, broadcast device 351 might also forward the instructions to surrounding devices that might rely on broadcast 351 for data uplink, such as, for example, wireless portable cameras. Yet, broadcast device 351 might itself represent a wireless portable camera. Once broadcast device 351 finishes executing the instructions it receives, the possibility of frequency interference is averted due to a proper assignment of limited broadcast frequencies, aided by the data relay capabilities of digital repeater module 310.

As described in the foregoing, a digital repeater module and method for relaying digital data supports a robust, flexible, error tolerant data transfer network for ENG and other applications. No longer are television studios tethered to their local receiver tower or relay; with the easily deployable digital repeater module, the operational radius of ENG teams can be extended on demand by simply adding more modules and connections. Supporting multiple concurrent reception and transmission links using advanced routing methods, the digital repeater device provides reliability and flexibility impossible with traditional single link methods. Additionally, reliability of the network scales upwards by simply adding redundant modules, allowing incremental upgrades to the network as budget permits. When placed at a high vantage point, the digital repeater module can also provide panoramic views of events around it through a locally attached camera. These dramatic shots are often highly sought in the ENG business, but require complex and expensive equipment setup, wasting valuable time and resources. With the digital repeater module, a high quality lightweight portable camera can provide similar results in a fraction of the usual deployment time. In addition, with the aid of GPS satellites, the digital repeater module can help coordinate frequency assignments for broadcast devices, further allowing ENG teams to focus on their job rather than worry about technical issues. Not only will ENG teams and television networks appreciate the benefits of the digital repeater device, but the public will also feel benefits from a wider, more reliable coverage of news and other televised events.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method for use by a digital repeater module for resolving assignment of limited broadcast frequencies, the method comprising:
   receiving frequency and Global Positioning System data from a first broadcasting device;
   transmitting the frequency and the Global Positioning System data to a frequency coordinator site assigned to the first broadcasting device;
   receiving from the frequency coordinator site instructions to relay to a second broadcasting device; and
   sending the instructions to the second broadcasting device to resolve possible frequency conflicts between the first broadcasting device and the second broadcasting device.

2. The method of claim 1, wherein the first broadcast device is an electronic newsgathering (ENG) vehicle or a wireless portable camera.

3. The method of claim 1, wherein the second broadcast device is an electronic newsgathering (ENG) vehicle or a wireless portable camera.

4. The method of claim 1, wherein the instructions comprise changing frequency.

5. A digital repeater module for resolving assignment of limited broadcast frequencies, the digital repeater module comprising:
   a data reception unit configured to receive frequency and Global Positioning System data from a first broadcasting device;
   a data transmission unit configured to transmit the frequency and the Global Positioning System data to a frequency coordinator site assigned to the first broadcasting device;
   wherein the digital repeater module is configured to:
      receive from the frequency coordinator site instructions to relay to a second broadcasting device; and
      send the instructions to the second broadcasting device to resolve possible frequency conflicts between the first broadcasting device and the second broadcasting device.

6. The digital repeater module of claim 5, wherein the first broadcast device is an electronic newsgathering (ENG) vehicle or a wireless portable camera.

7. The digital repeater module of claim 5, wherein the second broadcast device is an electronic newsgathering (ENG) vehicle or a wireless portable camera.

8. The digital repeater module of claim 5, wherein the instructions comprise changing frequency.

* * * * *